United States Patent
Hanyu et al.

(10) Patent No.: US 7,026,055 B2
(45) Date of Patent: Apr. 11, 2006

(54) METAL BOND STRENGTH IN POLYPROPYLENE FILMS

(75) Inventors: Aiko Hanyu, Houston, TX (US); William R. Wheat, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/280,418

(22) Filed: Oct. 25, 2002

(65) Prior Publication Data

US 2003/0104230 A1 Jun. 5, 2003

Related U.S. Application Data

(62) Division of application No. 08/954,324, filed on Oct. 17, 1997, now abandoned.

(51) Int. Cl.
*B32B 15/08* (2006.01)
(52) U.S. Cl. ...................... 428/461; 428/457; 428/500; 428/515; 428/516
(58) Field of Classification Search ................ 428/457, 428/461, 516, 523
See application file for complete search history.

(56) References Cited

U.S. PATENT DOCUMENTS

| | | | | |
|---|---|---|---|---|
| 3,620,825 A | * | 11/1971 | Lohmann et al. | ........... 428/336 |
| 5,691,043 A | * | 11/1997 | Keller et al. | ................. 428/212 |
| 6,407,177 B1 | * | 6/2002 | Shamshoum et al. | ....... 525/240 |

* cited by examiner

*Primary Examiner*—Monique R. Jackson
(74) *Attorney, Agent, or Firm*—William D. Jackson (57) ABSTRACT

The present invention relates to the improvement of metal bond strength in polypropylene films surface treated at higher levels through the addition to the basic isotactic polypropylene (iPP) polymer of an amount of syndiotactic polypropylene (sPP) in an amount no more than about 10 percent by weight and preferably in an amount between about 0.5 percent and about 8 percent by weight. The invention encompasses both the resulting metallized polypropylene films with enhanced bond strength and the process for producing such films. The prescribed use provides improved bonding properties over a simple non-blended isotactic polypropylene homopolymer, while maintaining at acceptable levels the optical and physical characteristics of a film made from non-blended iPP homopolymer. At increasing percentages of sPP above the preferred levels, bond strength continues to increase, but a deterioration in other properties may be noted, particularly in the optical property haze.

23 Claims, 5 Drawing Sheets

METAL BOND STRENGTH IN POLYPROPYLENE FILMS

This application is a division of prior application Ser. No. 08/954,324, filed Oct. 17, 1997, now abandoned. The present invention relates to a process for the preparation of polyethylenes and to the use of metallocene compounds as catalyst components for use in such a process.

BACKGROUND OF THE INVENTION

For some packaging films, the barrier properties are improved tremendously by vacuum depositing aluminum onto the surface of biaxially-oriented polypropylene films. Also, for decorating purposes metal deposition may be performed to give the film a reflective coating. Sometimes a lamination or other secondary process is performed which can damage the metal coating. Thus, a strong metal bond between the metal layer and the base or film layer is preferred. This preference extends more generally to other polypropylene films where greater metal bond strength improves the wear-life and quality of a deposited metal layer.

In films where metal coating is put directly onto a propylene homopolymer after surface treatment (such as corona treating (also known as corona discharge treating), flame treating, etc.) the metal bond is not noted to be very strong. However, often the physical and optical properties of a homopolymer polypropylene are more desirable to the overall objects of the film, necessitating against the use of a standard ethylene-polypropylene copolymer or ethylene-butene-polypropylene terpolymer, or other multiple polymer system known to have good bonding properties.

The polymers normally employed in the preparation of biaxially-oriented polypropylene films are isotactic polymers such as isotactic polypropylene, although on some occasions the use of syndiotactic polymers has been proposed. Isotactic polypropylene is one of a number of crystalline polymers which can be characterized in terms of the stereoregularity of the polymer chain. Various stereo-specific structural relationships denominated primarily in terms of syndiotacticity and isotacticity may be involved in the formation of stereoregular polymers for various monomers.

Isotactic polypropylene is conventionally used in the production of relatively thin films in which the polypropylene is heated and then extruded through dies and subjected to biaxial orientation by stressing the film in both a longitudinal direction (referred to as the machine direction) and in a transverse or lateral direction sometimes referred to as the "tenter" direction. The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following structural formula:

(1)

[Bolding for emphasis only]

Another way of describing the structure is through the use of NMR. Bovey's NMR nomenclature for an isotactic pentad is . . . mmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the chain lie on alternate sides of the plane of the polymer. Syndiotactic polypropylene can be illustrated by the following structural formula:

(2)

[Bolding for emphasis only]

Syndiotactic polymers are semi-crystalline and, like the isotactic polymers, are insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product. In most cases, the preferred polymer configuration for oriented propylene films will be a predominantly isotactic or syndiotactic polymer with very little atactic polymer.

The isotactic polymers normally employed in the preparation of biaxially-oriented polypropylene films are usually those prepared through the use of conventional Ziegler-Natta catalysts of the type disclosed, for example, in U.S. Pat. Nos. 4,298,718 and 4,544,717, both to Myer et al. Thus, U.S. Pat. No. 5,573,723 to Peiffer et al discloses a process for producing biaxially-oriented polypropylene film based on an isotactic polypropylene homopolymer or propylene/ethylene co-polymers. Other co-polymers of propylene and alpha-olefins having from 4–8 carbon atoms also may be employed in the Peiffer process.

Catalysts employed in the polymerization of alpha-olefins may be characterized as supported catalysts or unsupported catalysts, sometimes referred to as homogeneous catalysts. Traditional supported catalysts are the so-called "conventional" Ziegler-Natta catalysts, such as titanium tetrachloride supported on an active magnesium dichloride as disclosed, for example, in the aforementioned patents to Myer et al. A supported catalyst component, as disclosed in the Myer '718 patent, includes titanium tetrachloride supported on an "active" anhydrous magnesium dihalide, such as magnesium dichloride or magnesium dibromide. The supported catalyst component in Myer '718 is employed in conjunction with a co-catalyst such as an alkylaluminum compound, for example, triethylaluminum (TEAL). The Myer '717 patent discloses a similar compound which may also incorporate an electron donor compound which may take the form of various amines, phosphenes, esters, aldehydes, and alcohols. Metallocene catalysts are often employed as unsupported or homogeneous catalysts, although, as described below, they also may be employed in supported catalyst components.

Alternative types of catalysts that produce isotactic polyolefins are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

(3)

In formula (3), ($C_5$ (R')$_4$) is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

The various metallocene structures as described above can be used either as so-called "neutral metallocenes" in which case an alumoxane, such as methylalumoxane, is used as a co-catalyst, be employed as so-called "cationic metallocenes" which incorporate a stable non-coordinating anion and normally do not require the use of an alumoxane. For example, syndiospecific cationic metallocenes are disclosed in U.S. Pat. No. 5,243,002 to Razavi. As disclosed there, the metallocene cation is characterized by the cationic metallocene ligand having sterically dissimilar ring structures which are joined to a positively-charged coordinating transition metal atom. The metallocene cation is associated with a stable non-coordinating counter-anion. Similar relationships can be established for isospecific metallocenes.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, zirconia, and the like. Non-metallocene transition metal compounds, such as titanium tetrachloride, are also incorporated into the supported catalyst component. The Welborn '561 patent discloses a heterogeneous catalyst which is formed by the reaction of a metallocene and an alumoxane in combination with the support material. A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242,876 to Shamsoum et al. Various other catalyst systems involving supported metallocene catalysts are disclosed in U.S. Pat. Nos. 5,308,811 to Suga et al and 5,444,134 to Matsumoto.

SUMMARY OF THE INVENTION

The present invention relates to metallized polypropylene film. The film includes a film layer formed of a mixture of isotactic polypropylene and syndiotactic polypropylene where the syndiotactic polypropylene is present in amount no more than about 10 weight percent and preferably between about 0.5 weight percent and about 8 weight percent. The film layer is surface treated (preferably corona treated) on at least one side (i.e. on at least one surface) to a level of at least about 48 dynes/cm as measured contemporaneously with the treatment. The film layer is metallized after surface treatment with metal deposited on a surface of the film layer. The deposited metal layer has a thickness less than the film layer. The resulting film has a bond strength between the film layer and the metal layer which is at least 40 percent greater than the bond strength between the metal layer material and a correspondingly surface treated film layer formed of isotactic polypropylene homopolymer without the addition of syndiotactic polypropylene (in other words, without the presence of syndiotactic polypropylene). The present invention further relates to a method for producing such a metallized film. dr

DETAILED DESCRIPTION OF THE INVENTION

The present invention involves the use of a small amount of syndiotactic polypropylene in combination with isotactic polypropylene in the making of various films with enhanced metal bond strengths. While applicable in most propylene films where the basic physical and optical characteristics of a propylene homopolymer layer are needed, but an enhanced metal bonding strength is desired, the present description focuses on use in biaxially-oriented polypropylene films. It is to be recognized that the teachings of this invention are applicable regardless of whether a film is oriented in one, two, or no directions prior to the metallizing process.

Biaxially-oriented films are characterized in terms of certain well-defined characteristics relating to their stereo-regular structures and physical properties, including melt temperatures and shrinkage characteristics, as well as in relatively low coefficients of friction and relatively high tensile moduli and good barrier properties including relatively low permeation rates to oxygen and water. The biaxially-oriented films of the present invention are formed using a particularly configured polyolefin polymer as described in greater detail below and by using any suitable oriented film production technique, such as the conventionally-used tenter frame process.

The present invention addresses metallized films involving the combination of isotactic and syndiotactic polypropylene. While the preferred method involves separate polymerization of the isotactic and syndiotactic polypropylene followed by combination either after or before the pelletizing process, alternatively, the propylene could be polymerized in one batch using both syndiospecific and isospecific catalysts in amounts proportionate to the relative amount of syndiotactic and isotactic polypropylene desired in the final product. The product of such a polymerization would also be effective in practicing the invention.

The polymerized mixture will often further include minor amounts (typically less than 1 weight percent, and more typically less than 0.5 weight percent) of additives designed to enhance other physical or optical properties. Such mixtures may have, for example, one or more anti-oxidants present in an amount totaling no more than about 0.25 weight percent (in the tested examples below no more than about 0.15 weight percent) and one or more acid neutralizers present in an amount totaling no more than about 0.25 weight percent (in the tested examples below no more than about 0.05 weight percent). Although not present in the tested examples, additives acting as "anti-block" agents may also be present, again in relatively low percentages such as no more than about 1 weight percent, more preferably no more than about 0.5 weight percent, and even no more than about 0.25 weight percent.

In general, biaxially-oriented film production can be of any suitable technique, such as disclosed in the Canadian Patent Application No. 2,178,104 to Peiffer et al. As described in the Peiffer et al application, the entire disclosure of which is incorporated herein by reference, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions. The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometime with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as a surface treatment (for example corona treatment or flame treatment), as described, for example, in the aforementioned Canadian Patent Application No. 2,178,104 or in U.S. Pat. No. 4,692,380 to Reid, the entire disclosure of which is incorporated here by reference. The film may also be metallized as described in the aforementioned U.S. Pat. No. 4,692,380 to Reid. While corona and flame treatment typically occurs immediately following orientation and prior to the initial roll up, metallizing is typically performed at a separate time and location.

The metal coating (which when applied forms the metal layer) may be applied to one or both surfaces of the film by any known method such as sputtering, vacuum deposition, or electroplating (all of which fall with the definition of "metallizing" the film, and involving some act or method of "depositing" a metal onto the surface of the film layer). Vacuum deposition is a preferred method. Preferred values for the average thickness of the metal coating layer are within the range of about 20 to 100 nanometers, with the preferred average thickness for the film to be metallized being within the range of about 0.3 microns to 150 microns. Regardless, the metal layer preferably has a thickness less than the film layer, preferably substantially less than said film layer.

It is preferred to surface treat the surface of the film to be coated (or metallized) through either a corona discharge treatment or a flame treatment in order to improve metal bond strength. In accordance with the present invention, by surface treating (preferably corona treating) the ethylene-propylene copolymer, metal bond strength is further enhanced. Preferably in carrying out the present invention, the ethylene-propylene film layer is surface treated to a level of about 48 dynes/cm or more, providing the most dramatic results as illustrated by the example below.

The most frequently used coating material is aluminum, although other metals such as gold, silver, and copper are also employed on occasion. As will be recognized by those skilled in the art, while the metal coating predominantly consists of the identified metal (such as aluminum) amounts of other additives may be present to improve assorted physical and optical properties of the deposited metal layer. In some occasions, pure aluminum (or the metal of choice) may be used. Other additives may be used in minor amounts such that aluminum (or the metal of choice) is the major component. Preferably aluminum (or the metal of choice) is present in the coating at levels of at least about 90 weight percent, at least about 95 weight percent, and at least about 99 weight percent of the metal coating.

Figure 1:
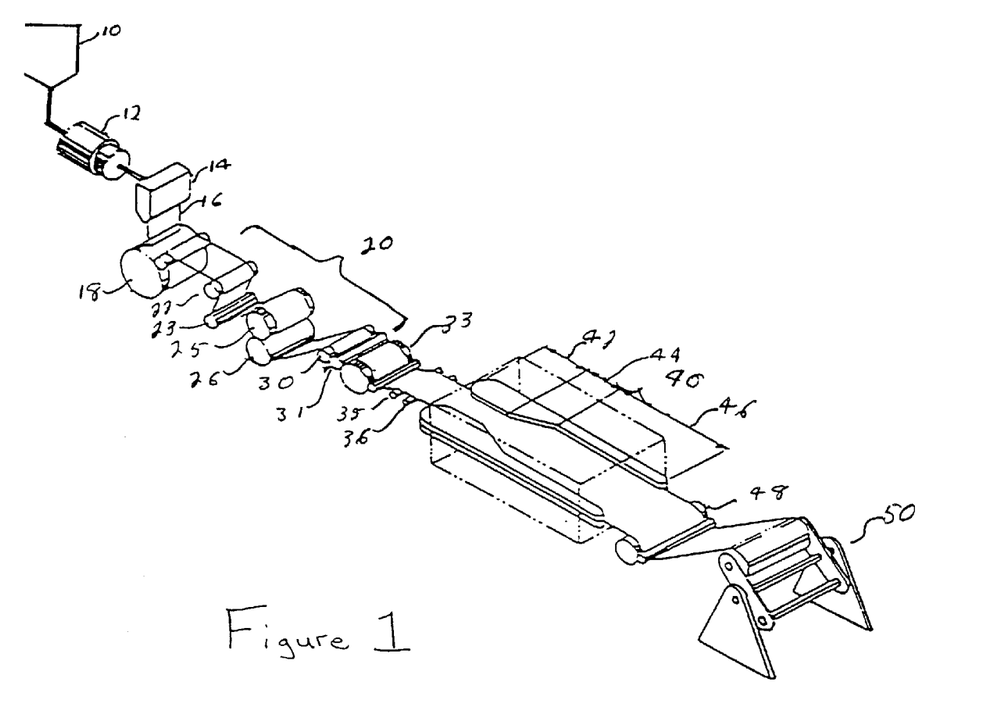
FIG. 1 is a diagram of reflecting an exemplary tenter-frame process for producing biaxially-oriented polypropylene films.

Turning now to FIG. 1, there is shown a schematic illustration of a suitable "Tenter Frame" orientation process which may be employed in producing biaxially-oriented polypropylene film ("BOPP film") in accordance with the present invention. More particularly and with reference to FIG. 1, a source of molten polymer is supplied from a hopper 10 to an extruder 12 and from there to a slot die 14 which produces a flat, relatively thick film 16 at its output. Film 16 is applied over a chill roller 18, and it is cooled to a suitable temperature within the range of about 30–60° C. The film is drawn off the chill roller 18 to a stretching section 20 to which the machine direction orientation occurs by means of idler rollers 22 and 23 which lead to preheat rollers 25 and 26.

As the film is drawn off the chill roller 18 and passed over the idler rollers, it is cooled to a temperature of about 30–60° C. In stretching the film in the machine direction, it is heated by preheat rollers 25 and 26 to an incremental temperature increase of about 60–100° C. and then passed to the slow roller 30 of the longitudinal orienting mechanism. The slow roller may be operated at any suitable speed, usually about 20–40 feet per minute in this type of pilot production line. The fast roller 31 is operated at a suitable speed, typically about 150 feet per minute in a pilot line, to provide a surface speed at the circumference of about 4–7 times that of the slow roller in order to orient the film in the machine direction. In a commercial production line, casting speeds may be much higher such as 20 to 60 meters per minute, with 120 to 360 meters per minute in final speeds.

As the oriented film is withdrawn from the fast roller, it is passed over roller 33 at room temperature conditions. From here it is passed over tandem idler rollers 35 and 36 to a lateral stretching section 40 where the film is oriented by stretching in the transverse direction. The section 40 includes a preheat section 42 comprising a plurality of tandem heating rollers (not shown) where it is again reheated to a temperature within the range of 130–180° C. From the preheat section 42 of the tenter frame, the film is passed to a stretching or draw section 44 where it is progressively stretched by means of tenter clips (not shown) which grasp the opposed sides of the film and progressively stretch it laterally until it reaches its maximum lateral dimension. Lateral stretching ratios are typically greater than machine direction stretch ratios and often may range anywhere from 5–12 times the original width. Ratios of 8–10 times are usually preferred. The concluding portion of the lateral stretching phase includes an annealing section 46, such as an oven housing, where the film is heated at a temperature within the range of 130–170° C. for a suitable period in time, about 1–10 seconds. The annealing time helps control certain properties, and increased annealing is often specifically used to reduce shrinkage. The biaxially-oriented film is then withdrawn from the tenter frame and passed over a chill roller 48 where it is reduced to a temperature of less than about 50° C. and then applied to take-up spools on a take-up mechanism 50. From the foregoing description, it will be recognized that the initial orientation in the machine direction is carried out at a somewhat lower temperature than the orientation in the lateral dimension. For example, the film exiting the preheat rollers is stretched in the machine direction at a temperature of about 120° C. The film may be cooled to a temperature of about 50° C. and thereafter heated to a temperature of about 160° C. before it is subject to the progressive lateral dimension orientation in the tenter section.

The following examples illustrate the unexpected advantages in metal bond strength at increased levels of surface treatment provided by the present invention. The examples also provide an illustration of the effects of the present invention on other physical and optical properties.

EXAMPLE 1

Several resins with varying amounts of primarily syndiotactic polypropylene (referred to simply hereinafter as syndiotactic polypropylene or "sPP") blended with primarily isotactic polypropylene (referred to simply hereinafter as isotactic polypropylene or "iPP") were processed through a biaxially-oriented polypropylene film making process using a tenter frame system and the resulting properties then measured. The isotactic polypropylene was polymerized separately from the syndiotactic polypropylene, and the resulting polymer fluffs blended in a separate compounding step in the pelletizing process.

The trial was conducted in a sixty inch continuous pilot tenter line. The line was capable of 76.2 meter per minute output and two sided corona discharge treatment. Biaxial orientation of flat films was carried out in two sequential steps. The casted sheet chilled on a rotating cold steel roll was first stretched longitudinally (in the machine direction or "MD") in the tangential gap between sets of rolls rotating at different speeds. Subsequently, the film was stretched transversely (in the transverse direction or "TD") in a tenter frame in which the edges of the film were gripped by a series of clips and diverged in TD. Standard MD draw ratio was 5 in one stage (5×:1×) and that in TD was consistently 9 (1×:9×). The films were surface treated by means of corona discharge treatment (corona treatment) with the level of treatment measured contemporaneously closely following the treatment. Temperature settings are listed in Table 1 below:

TABLE 1

| Temp | Melt | Cast Roll | Chill Roll | MDO | | | TDO | | |
|---|---|---|---|---|---|---|---|---|---|
| | | | | Cond | Stretch | Anneal | Cond | Stretch | Anneal |
| ° C. | 221 | 43 | 49 | 116 | 121 | 127 | 166 | 160 | 154 |
| ° F. | 430 | 110 | 120 | 240 | 250 | 260 | 330 | 320 | 310 |

This process was used to produce three monolayer BOPP film samples with various sPP fractions. Sample CS-1 was a controlled sample containing isotactic polypropylene generated using standard Ziegler-Natta catalysis and further including the following additives: Irganox 1010 (an anti-oxidant) in an amount of 0.1 weight percent, Irgafos 168 (an anti-oxidant) in an amount of 0.05 weight percent, and calcium stearate (an acid neutralizer) in an amount of 0.05 weight percent. Sample HLS-1 was configured identically with the sole exception that the polypropylene included 2 percent by weight sPP. Sample HLS-2-2 was similarly configured to include 5 weight percent sPP.

The metal bond strength of each of the proceeding sample films was evaluated as follows. The mono-layer films were produced and oriented and then corona-treated at either a "low level" (i.e. 43–47 dynes/cm) or a "high level" (i.e. 52–56 dynes/cm). After production, orientation, and corona treatment, the films were then metallized by vacuum depositing aluminum metal onto one surface of the films. The films were then extrusion laminated with LDPE (low density polyethylene) on the metallized side to another film. The resulting lamination was peeled apart in an Instron. Because of its higher bond strength with polyethylene than with polypropylene, the metal usually adheres to the polyethylene. Thus, the strength required for delamination is the measure of the bond strength of the metal to the polypropylene substrate (the base film). Even if failure were to occur in a different mode, the results would still constitute a minimum boundary for the strength of the polypropylene to metal bond, as that bond would not yet have failed when the alternative failure mode occurred. The results for each of the samples at each level of corona treatment are listed in Table 2 below:

TABLE 2

| | Comparative Example 1 | Example 1 | Example 2 |
|---|---|---|---|
| Resin Label | CS-1 | HLS-1 | HLS-2-2 |
| sPP, weight percent | 0.0 | 2.0 | 5.0 |
| Lamination Bond Strength | | | |
| Maximum, N/m [High Level Corona] | 54 | 81 | 107 |
| Averaged, N/m [High Level Corona] | 39 | 58 | 91 |
| Maximum, N/m [Low Level Corona] | 90 | 64 | 74 |
| Averaged, N/m [Low Level Corona] | 59 | 48 | 57 |

These results demonstrate that the addition of sPP in an amount of 2 weight percent in films corona treated at a level between 52–56 dynes/cm provided an improvement in the metal bond strength averaging about 50 percent greater than the metal bond strength of the same metal layer with a correspondingly surface treated (i.e., surface treated using the same method of treatment to about the same level) film formed of non-blended isotactic polypropylene homopolymer (i.e., without the addition/presence of sPP). The results further demonstrate that the addition of 5 weight percent sPP in a film corona treated at a level of 52–56 dynes/cm provided an at least twofold improvement in the metal bond strength averaging about 133 percent greater than the metal bond strength of the same metal layer with a correspondingly surface treated film formed of non-blended isotactic polypropylene homopolymer. This experimental work shows increases of at least about 40 percent based on the addition of 2 weight percent sPP and at least double and even at least about 125 percent based on the addition of 5 weight percent sPP. Lower percentages are also anticipated to provide benefits although possibly more in the range of 15 to 25 percent for values below 2 weight percent, with benefits even expected at levels as low as 0.5 weight percent sPP.

Review of the testing at lower levels of corona treatment (43–47 dynes/cm as measured contemporaneously with treatment) reveal that the advantages gained in fact provide an unexpected trend in metal bonding strength at the increased levels of corona treatment. The control sample of non-blended isotactic polypropylene shows a decrease in bond strength averaging 33 percent and a decrease in the maximum bond strength of 40 percent as its corona treatment is raised from the "low level" to the "high level." In marked contrast, the blended polypropylenes incorporating small percentages of syndiotactic polypropylene are showing marked increases in metal bond strength. These results demonstrate that, contrary to the normal trend, where greater metal bond strength is desired at increasing levels of surface treatment (preferably corona treatment) above 43–47 dynes/cm such as at least about 48 dynes/cm, between about 48–56 dynes/cm or more preferably between about 52–56 dynes/cm (all as measured contemporaneously with treatment) the addition of small percentages of sPP is advantageous.

EXAMPLE 2

Figure 2:
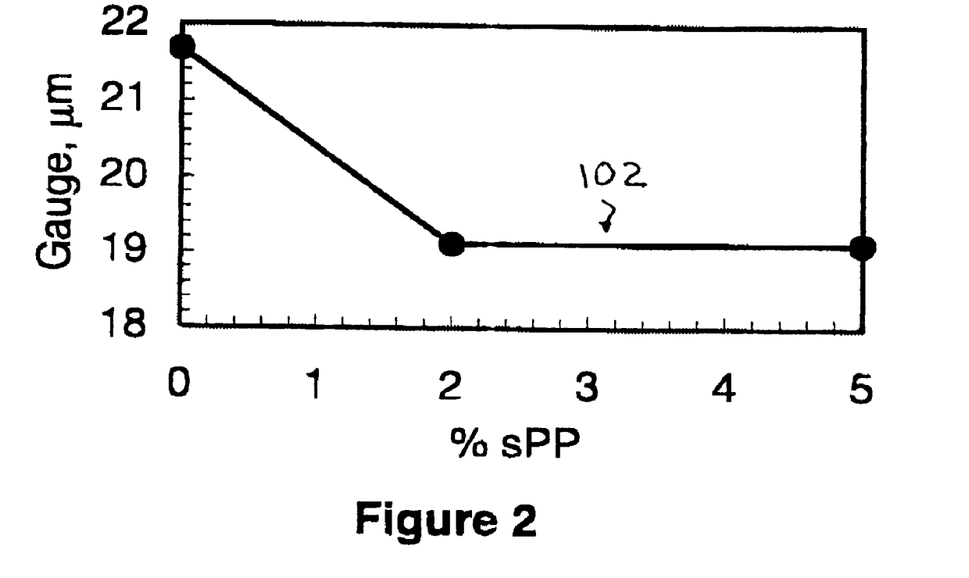
FIG. 2 is a graph illustrating the relationship between gauge and percentage sPP.
Figure 3:
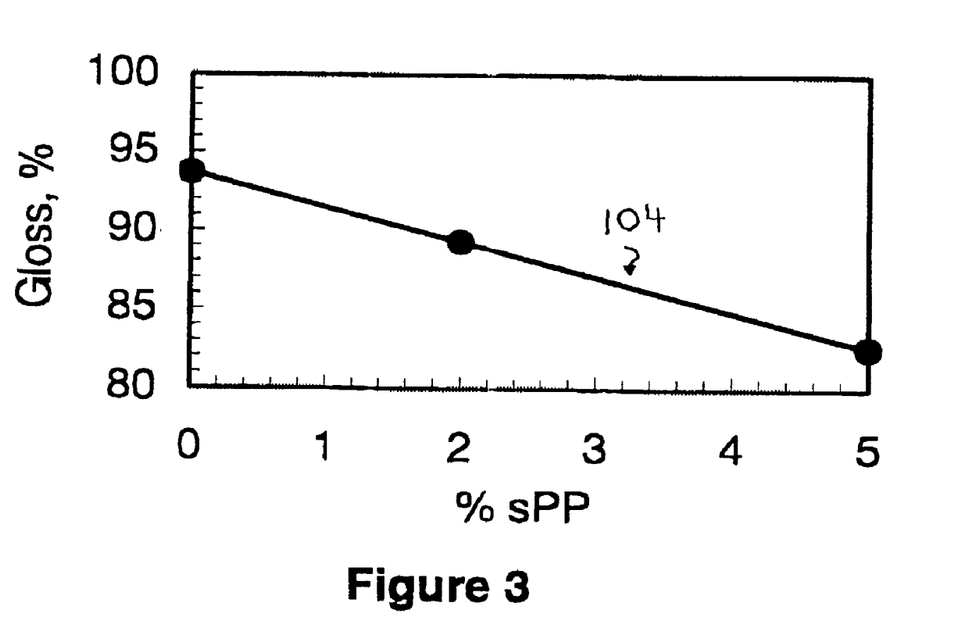
FIG. 3 is a graph illustrating the relationship between gloss and percentage sPP.
Figure 4:
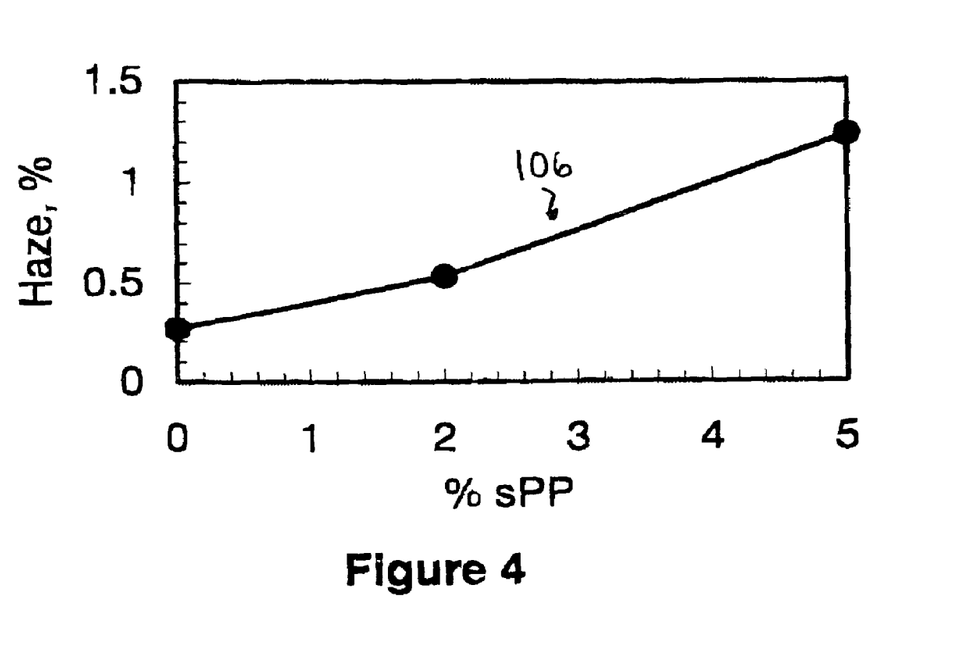
FIG. 4 is a graph illustrating the relationship between haze and percentage sPP.
Figure 5:
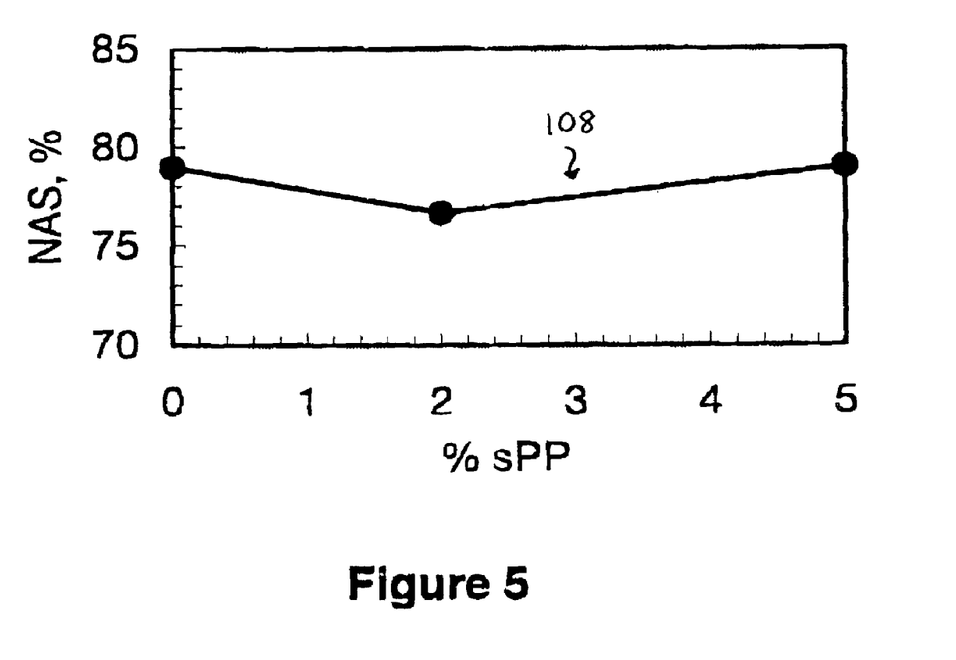
FIG. 5 is a graph illustrating the relationship between NAS (a measure of contact clarity) and percentage sPP.
Figure 6:
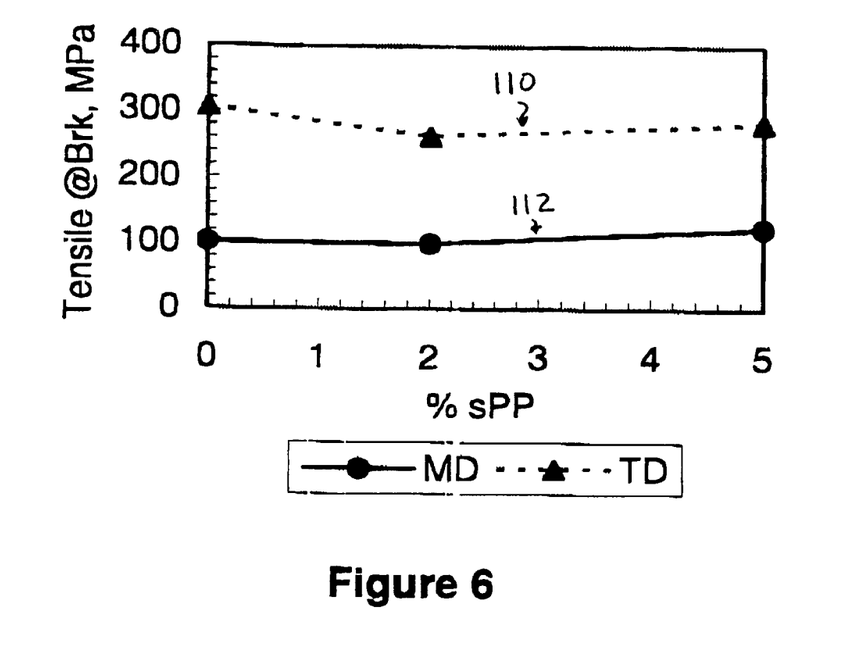
FIG. 6 is a graph illustrating the relationship between tensile strength at break and percentage sPP in both the machine direction and the transverse direction.
Figure 7:
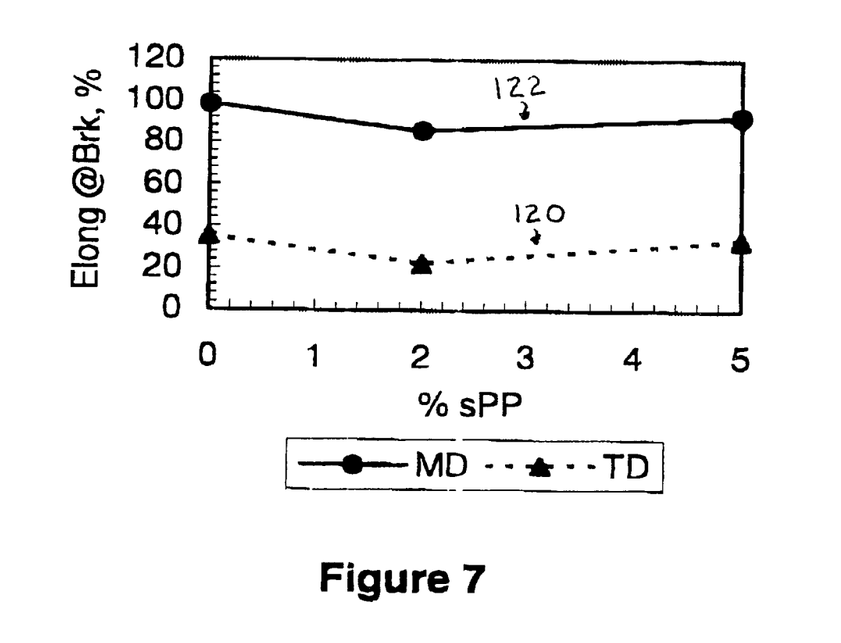
FIG. 7 is a graph illustrating the relationship between elongation at break wand percentage sPP in both the machine direction and the transverse direction.
Figure 8:
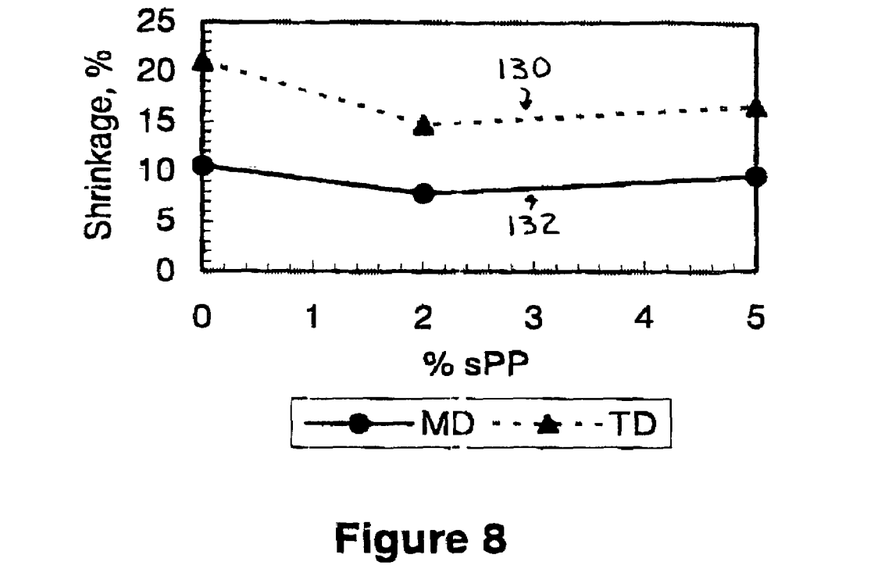
FIG. 8 is a graph illustrating the relationship between shrinkage percentage and percentage sPP in both the machine direction and the transverse direction.
Figure 9:
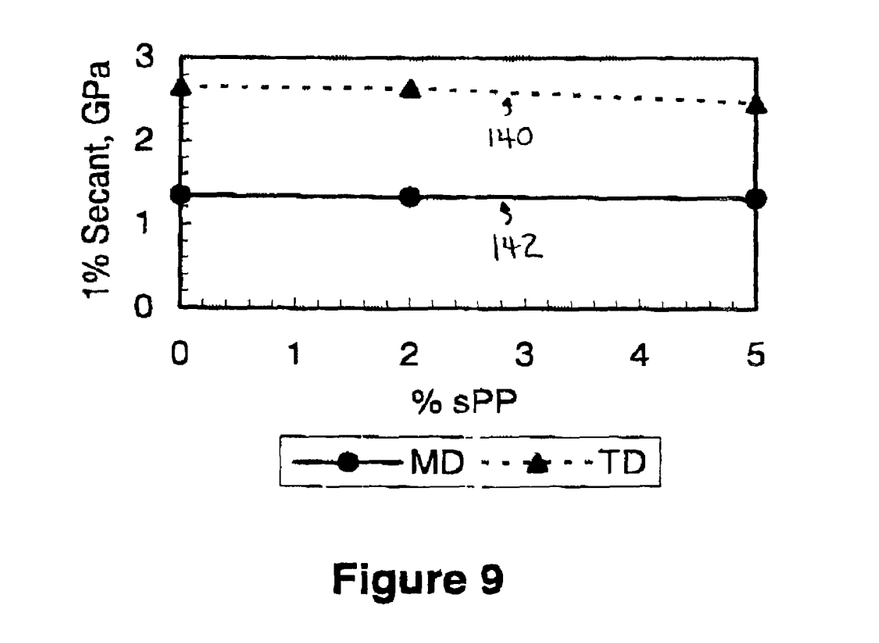
FIG. 9 is a graph illustrating the relationship between 1% secant modulus and percentage sPP in both the machine direction and the transverse direction.

Another set of biaxially-oriented polypropylene films were formed and oriented using methods identical to those of the Example 1. This set, however, was not metallized, but was instead tested for both its optical and physical properties as a monolayer BOPP film. FIGS. 2–8 reflect the results of various optical and physical tests performed on the unmetallized films which were corona treated at 52–56 dynes/cm. In each of FIGS. 2–8, the measured parameter as described below is plotted on the ordinate versus the weight percent of sPP present in the sample which is plotted on the abscissa. In FIG. 2, curve 102 illustrates the relationship between the gauge, measured in microns, and weight percent of sPP. In FIG. 3, curve 104 illustrates the relationship between gloss, measured in percent, and weight percent of sPP. In FIG. 4, curve 106 illustrates the relationship between haze, measured in percent, and weight percent of sPP. In FIG. 5, curve 108 illustrates the relationship between NAS, measured in percent, and weight percent of sPP. In FIG. 6, curve 110 illustrates the relationship between tensile strength at break in the transverse direction, measured in megapascals, and weight percent sPP. Also in FIG. 6, curve 112 illustrates the relationship between tensile strength at break in the machine direction, measured in megapascals, and weight percent sPP. In FIG. 7, curve 120 illustrates the relationship between elongation at break in the transverse, direction, measured in percent, and weight percent sPP. Also in FIG. 7, curve 122 illustrates the relationship between elongation at break in the machine direction, measured in percent, and weight percent sPP. In FIG. 8, curve 130 illustrates the relationship between shrinkage in the transverse direction, measured in percent, and weight percent sPP. Also in FIG. 8, curve 132 illustrates the relationship between shrinkage in the machine direction, measured in percent, and weight percent sPP. In FIG. 9, curve 140 illustrates the relationship between 1% secant modulus in the transverse direction, measured in gigapascals, and weight percent sPP. Finally, also in FIG. 9, curve 142 illustrates the relationship between 1% secant modulus in the machine direction, measured in gigapascals, and weight percent sPP.

Optical properties appear to be very dependent upon sPP/iPP blend compositions of the mixtures. These properties are apt to depend on the size and number of the dispersed particles as a consequence to the immiscibility between iPP and sPP in the composition.

Most notably, haze increases with the increasing fraction of sPP in the blend. Addition of 5 weight percent sPP more than doubles the haze value of non-blended iPP homopolymer. Haze is a phenomena of light scattering and arises from local variations in the refractive index as in the case of incompatible blend or in the orientation of anisotropic volume elements. Haze is defined as the relative fraction of scattered intensity from the dispersed particles in all direction, being detected in a range of wide angle (angle>2.5°), to the incident light intensity. In basic terms, haze corresponds to the subjective "cloudiness" of the film. The results suggest that blends with the increasing fraction of sPP contain a larger number of sPP particles and/or larger size particles (see FIG. 5). While in an absolute sense, the haze rating between 1 and 1.5 percent for the 5 weight percent sPP blend is perfectly acceptable for some uses, haze numbers of less than 1 percent or less than or about 0.5 percent (such as exhibited by both the non-blended iPP and the 2 percent sPP blend) are preferred for many applications.

NAS is a measure of contact clearness or see-through quality and is separated from the simple clearness in terms of haze which is due to the direct transmittance of light. When a hazy material still appears clear as a packaging when in contact with the contents, this is reflecting a good NAS. Unlike haze, NAS is distance dependent so that the thinner the film, the better the contact clarity. The 5 percent sPP blend is shown to provide a slightly better NAS value than the unblended iPP film, while the best value comes from the 2 percent sPP blend (see FIG. 5). Note, however, that the decreasing gauge of the blended films as produced (see FIG. 2) may be in part responsible for this improvement.

Gloss is defined as the ratio of the reflected light intensity from the sample at a specific angle of incidence light to that of a standard with the ideal smooth surface. Gloss depends on such surface defects as micro-irregularities and scratches and on internal structure. Gloss decreases with the increasing fraction of sPP in the blends (see FIG. 3). The immiscible sPP phase just below the surface may cause marked light scattering and reduce the intensity of reflected light from the surface, resulting in decreased value in gloss.

Overall, non-blended standard iPP demonstrated superior optical properties to the samples of iPP blended with larger amounts of sPP. To maintain the best optical properties while incorporating sPP blends, a thin film with a small fraction of sPP (for example 2 percent) is preferred. Additionally, where optical properties are at a premium, corona treatment at a level of 48–52 dynes/cm is preferred over more aggressive corona treatment such as 52–56 dynes/cm to achieve better optical properties while still gaining the anticipated benefits of the improved bonding strength of the present invention.

Physical properties are compared in FIGS. 6–9. As stated previously, all films were processed at standard conditions of MD draw ratio=5 and TD draw ratio=9. Thus, it is expected that properties in TD direction (highly stretched and oriented) exhibit higher tensile strength, higher shrinkage, and lower elongation, compared with those in the MD direction. The tensile strength at break (see FIG. 6) demonstrates that the continuous major phase of iPP remains relatively strong and rigid in these blends. Also of note is the fact that the 1% secant modulus remained virtually unchanged (see FIG. 9) regardless of the addition of sPP or the amount added of sPP, reflecting the ability to add sPP at these levels without negatively affecting the desirable stiffness properties associated with non-blended iPP homopolymer. The minor dispersed phase of sPP has almost no detrimental softening effect upon the rigid matrix at the levels tested. Furthermore, addition of a small fraction of sPP (no more than 5 weight percent) lowers free shrinkage and elongation at break considerably (see FIGS. 8 & 7 respectively). However, this advantage has lessened by the 5 weight percent level. Overall, the preferred fraction of sPP to maintain better processability, mechanical properties, and low free shrinkage is less than about 5 weight percent sPP.

In summary, while differing applications for the films may require some difference in optical and physical properties, the use of a minor amount of sPP in an isotactic polypropylene blend offers significant advantages. The addition of no more than about 10 percent of sPP into polypropylene blends used to make film consistently provides enhanced metallic bond strength in the final film where surface treatment levels (preferably corona treatment levels or alternatively flame treatment levels) are above 47 dynes/cm (at least about 48 dynes/cm, more preferably in the range of about 48 dynes/cm to about 56 dynes/cm, most preferably in the range of about 52 to about 56 dynes/cm) as measured contemporaneously with the treatment. Where optical and physical properties are of paramount importance, the sPP content preferably should be no more than about 8 percent, and most preferably no more than about 5 percent sPP should be added to maintain similar optical and physical properties of non-blended iPP homopolymer while gaining the advantage of improved metal bond strength.

If optical properties are not as critical, but high metal bond strength is, preferably sPP weight percentage should be between about 4 and about 6 percent, most preferably about 5 weight percent sPP. If more premium haze values are called for, or a mixture of physical and optical advantages while still showing the improved metal bond strength, then sPP weight percentage is preferably between about 1 and about 3 percent, and most preferably about 2 weight percent sPP.

Having described specific embodiments of the present invention, it will be understood that modifications thereof may be suggested to those skilled in the art, and it is intended to cover all such modifications as fall within the scope of the appended claims.

What is claimed is:

1. A metallized polyolefin film combination comprising:
   (a) a film layer formed of a mixture of isotactic polypropylene and syndiotactic polypropylene and surface treated on at least one surface of said film layer;
   (b) a metal layer deposited onto said treated surface of said film layer, said metal layer being contiguous to said film layer and having a thickness less than said film layer; and
   (c) said syndiotactic polypropylene being present in said film layer in an amount of no more than about ten weight percent which is effective to provide a bond strength with said metal layer which is at least 40 percent greater than the bond strength between said metal layer material and a correspondingly surface treated film layer formed of isotactic polypropylene homopolymer without the addition of syndiotactic polypropylene.

2. The combination of claim 1, wherein said metal layer has an average thickness within the range of about 20 to 100 nanometers and said film layer has a average thickness within the range of about 0.3 to 150 microns, said metal layer having a thickness less than said film layer.

3. The combination of claim 1, wherein said film layer is surface treated to an intensity level of at least about 48 dynes/cm as measured contemporaneously with the treatment.

4. The combination of claim 1, wherein said film layer formed of a mixture of isotactic polypropylene and syndiotactic polypropylene contains syndiotactic polypropylene in an amount between one-half and eight weight percent.

5. The combination of claim 1, wherein said film layer formed of a mixture of isotactic polypropylene and syndiotactic polypropylene contains syndiotactic polypropylene in an amount between one and about three weight percent.

6. The combination of claim 1, wherein said film layer formed of a mixture of isotactic polypropylene and syndiotactic polypropylene contains syndiotactic polypropylene in an amount of two weight percent.

7. The combination of claim 1, wherein said film layer formed of a mixture of isotactic polypropylene and syndiotactic polypropylene contains syndiotactic polypropylene in an amount between four and about six weight percent.

8. The combination of claim 6, wherein said bond strength between said metal layer and said film layer is at least double the bond strength between said metal layer of material and a correspondingly surface treated film layer formed of isotactic polypropylene homopolymer without the addition of syndiotactic polypropylene.

9. The combination of claim 1, wherein said film layer formed of a mixture of isotactic polypropylene and syndiotactic polypropylene contains syndiotactic polypropylene in an amount of five weight percent.

10. The combination of claim 1, wherein said metal layer contains aluminum.

11. The combination of claim 1, wherein said metal layer contains aluminum in an amount of at least ninety weight percent.

12. The combination of claim 1, wherein said metal layer contains aluminum in an amount of at least ninety-five weight percent.

13. The combination of claim 1, wherein said metal layer contains aluminum in an amount of at least ninety-nine weight percent.

14. The combination of claim 1, wherein said polyolefin film is oriented in at least one direction.

15. The combination of claim 1, wherein said polyolefin film is biaxially oriented.

16. The combination of claim 1, wherein said mixture of isotactic polypropylene and syndiotactic polypropylene further comprises at least one anti-oxidant in an amount of no more than 0.25 weight percent and at least one acid neutralizer in an amount of no more than 0.25 weight percent.

17. The combination of claim 1, wherein said film layer is characterized by surface treatment to an intensity level of between 48 dynes/cm and 56 dynes/cm as measured contemporaneously with the treatment.

18. The combination of claim 17, wherein said film layer is characterized by surface treatment to an intensity level of between 52 dynes/cm and dynes/cm as measured contemporaneously with the treatment.

19. The combination of claim 1 wherein said syndiotactic polypropylene is present in said film layer in an amount of at least 2 weight percent.

20. The combination of claim 19 wherein said syndiotactic polypropylene is present in said film layer in an amount between 4 and 6 weight percent.

21. The combination of claim 20 wherein said film layer is characterized by surface treatment to an intensity level of between 52 dynes/cm and 56 dynes/cm as measured contemporaneously with the treatment.

22. The combination of claim 21 wherein said bond strength between said metal layer and said film layer is at least double the bond strength between said metal layer material and an identically surface treated comparative film layer formed of polypropylene homopolymer without the addition of syndiotactic polypropylene.

23. The combination of claim 1 wherein said syndiotactic polypropylene is present in said film layer in an amount between 1 and 3 weight percent.

* * * * *